Woodruff & Beach.

Pump.

No. 3,399. Reissued Apr. 20, 1869.

Fig 2. y.y.

Witnesses.
Sam. G. Woodruff
A. L. Brach.

Inventors.
Sam'l Woodruff
H. B. Brach

N. PETERS, PHOTO-LITHOGRAPHER, WASHINGTON, D. C.

United States Patent Office.

SAMUEL WOODRUFF AND H. B. BEACH, OF HARTFORD, CONNECTICUT.

*Letters Patent No.* 82,371, *dated September* 22, 1868; *reissue No.* 3,399, *dated April* 20, 1869.

IMPROVEMENT IN PUMPS.

The Schedule referred to in these Letters Patent and making part of the same.

*To all whom it may concern:*

Be it known that we, SAMUEL WOODRUFF and H. B. BEACH, both of Hartford, in the county of Hartford, and State of Connecticut, have invented a new and useful Improvement in Pumps; and we do hereby declare that the following is a full, clear, and exact description thereof, reference being had to the accompanying drawings, making part of this specification, in which—

Figure 1:
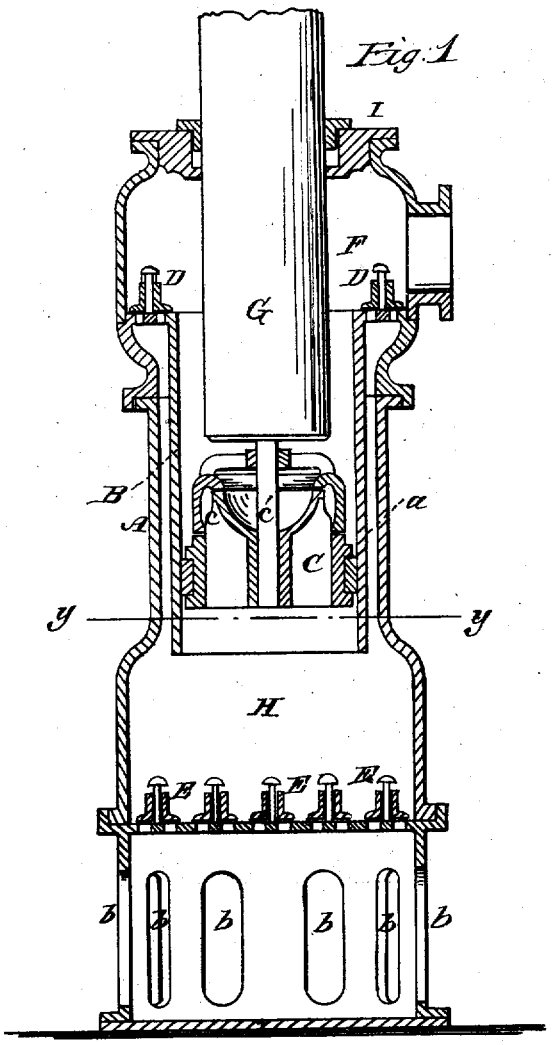
Figure 1:
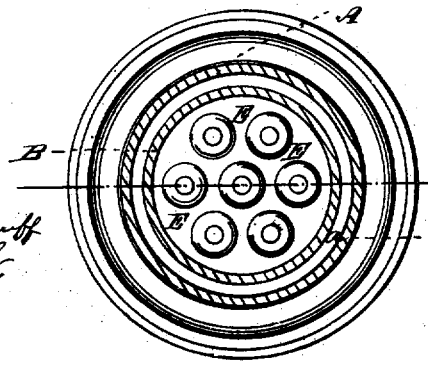

Figure 1 is a section of our improved pump, taken in the plane of the vertical axis of the pump-cylinder, and Figure 2, a horizontal section, taken at the line *y y*, of fig. 1.

The same letters indicate like parts in both figures.

Our said invention relates to an improvement on a pump described in and secured by Letters Patent of the United States, granted to William Wright, and bearing date the 15th day of November, 1859, which pump consists of two concentric cylinders, so connected as to leave an annular space all around between the two, for the passage of water, which is controlled by a double-beat valve, an open piston, with a double-beat valve, being fitted to work in the inner cylinder, two such pumps being connected by a pipe, the upper or delivery-end of one such pump, with the lower or receiving-end of another such pump, so, that when the piston of one pump is lifting, and the piston of the other is descending, the column of water which is being lifted, passes through the piston-cylinder and the annular space between the two cylinders of the other pump, and *vice versa*. And, although the said pump has some valuable features, yet it is objectionable, on account of the necessity of using two such pumps in connection, to obtain a continuous flow of water, and because of the use of so large a double-beat valve as is required to connect the inner and the outer cylinders.

The object of our said invention is to avoid the defects of the pump described in the said Wright's patent; and to that end, our said invention consists in combining with the chamber, between the inner and the outer cylinders, and having a valvular eduction-passage, a valvular piston fitted to the inner cylinder, and a plunger, of less diameter than the inner cylinder, connected, and moving in unison with the valvular piston, and with an induction-valve or valves below, by reason of which combination a pump is produced, which is single-acting in one direction, and double-acting in the opposite direction.

And our said invention also consists in combining with the inner cylinder and outer casing, forming an annular chamber between them, and with the valvular piston and plunger, and the induction-valve at the lower end, a series of small eduction-valves in the annular chamber.

In the accompanying drawings—

B represents the pump-cylinder, to the bore of which is properly fitted a valvular piston, C, by preference provided with a double-beat valve, *c*.

This piston is connected by any suitable means, such as a rod, *c'*, with a plunger G, of less diameter than the bore of the cylinder B, so as to leave a free passage for water to the eduction-chamber F.

The said pump-cylinder or barrel B is surrounded by an outer cylinder or casing, A, of about the same length, leaving an annular chamber, *a*, for the free passage of water, and these two cylinders are connected, at their upper end, by a plate, as represented, having a series of apertures, provided with eduction-valves D, for the passage of water from the annular chamber *a* to the eduction-chamber F.

Below the lower end of the pump-cylinder or barrel, we prefer to enlarge the outer casing, or cylinder A, to make the induction-chamber H of considerable capacity, and the bottom plate of this chamber H is provided with a series of induction-valves, E, which, like the eduction-valves D, at the upper end, we prefer to make of the puppet kind.

The pump may rest on a hollow base, pierced with induction-passages *b*, for the admission of water.

The cylindrical plunger G is fitted to work in a stuffing-box in the cap I, of the eduction-chamber F.

From the foregoing it will be seen that when the plunger G and valvular piston C are lifted, the valvular piston lifts the water above it, which, passing in the space between the plunger and the cylinder B, passes into the eduction-chamber, and is thence discharged, while, at the same time, the said valvular piston acts by suction, causing water to flow through the induction-valves E by the pressure of the atmosphere, and that, during the downward stroke of the valvular piston and plunger, the induction-valves are closed, and the piston, whose valve is open, passes through the body of water in the cylinder, and as the plunger, in descending into the cylinder, must displace a bulk of water equal to itself, it acts to force such water up in the annular space between itself and the cylinder, and up the chamber *a*, through the valves D, into the eduction-chamber F, whence it flows out. In this way a constant flow of water is produced without the necessity of two pumps, as described in the said Wright's patent.

And by the use of a series of small valves at the upper end of the chamber, between the pump-barrel and outer cylinder or case, we avoid the difficulty experienced in the use of a double-beat valve of large size, viz, the difficulty of fitting and keeping them in order, and overcoming the inertia of valves of such weight at every stroke.

It will be noted that the first part of our said invention may be used without the second part, as the said first part may be worked by double-beat valves, or any other kind of eduction-valves, for the passage of water from the chamber *a* into the eduction-chamber F, and so with the induction-valves at the lower end.

What we claim as our invention, is—

The combination of the following devices, viz, the chamber *a* between the inner cylinder and outer case, having a valvular eduction-passage, the valvular piston C, and the plunger G, connected and moving together, and the valvular induction-passage or passages at the lower end, substantially as described, and having the mode of operation set forth.

Also, in combination with annular chamber *a*, between the cylinder B and the outer casing A, the valvular piston and plunger G, and the induction-valves E, below the cylinder, a series of small eduction-valves D, in the said annular chamber, substantially as and for the purpose described.

SAM'L WOODRUFF.
H. B. BEACH.

Witnesses:
LAM. V. WOODRUFF,
H. L. BEACH.